(12) United States Patent
Chandrasekaran et al.

(10) Patent No.: US 11,729,276 B2
(45) Date of Patent: Aug. 15, 2023

(54) RAPID ONLINE VARIABLE SOURCING INFRASTRUCTURE (ROVS) FOR DECISION SYSTEMS

(71) Applicant: PayPal, Inc., San Jose, CA (US)

(72) Inventors: Ravi Shankar Chandrasekaran, Santa Clara, CA (US); Dinesh Damodharan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 74 days.

(21) Appl. No.: 17/094,250

(22) Filed: Nov. 10, 2020

(65) Prior Publication Data
US 2022/0150328 A1 May 12, 2022

(51) Int. Cl.
*G06Q 30/00* (2023.01)
*G06N 3/08* (2023.01)
*G06N 7/00* (2023.01)
*G06Q 20/32* (2012.01)
*G06F 16/955* (2019.01)
*H04L 67/00* (2022.01)
*H04L 67/12* (2022.01)
*H04L 67/133* (2022.01)
*H04L 67/567* (2022.01)

(52) U.S. Cl.
CPC .............. *H04L 67/34* (2013.01); *H04L 67/12* (2013.01); *H04L 67/133* (2022.05); *H04L 67/567* (2022.05)

(58) Field of Classification Search
CPC ..... H04L 67/34; H04L 67/12; H04L 67/2838; H04L 67/40; G06Q 20/405; G06Q 20/36; G06Q 20/363; G06Q 20/351
USPC .......................................................... 709/220
See application file for complete search history.

(56) References Cited

U.S. PATENT DOCUMENTS

| | | | | |
|---|---|---|---|---|
| 6,018,723 A * | 1/2000 | Siegel | ..................... | G06Q 40/08 705/42 |
| 8,639,629 B1 * | 1/2014 | Hoffman | ............ | G06Q 20/3821 705/64 |
| 8,768,838 B1 * | 7/2014 | Hoffman | ................ | G06Q 40/00 705/72 |
| 9,443,192 B1 * | 9/2016 | Cosic | ..................... | G06N 5/048 |
| 10,810,584 B2 * | 10/2020 | Turgeon | ............. | G06Q 20/4016 |
| 10,887,276 B1 * | 1/2021 | Parulkar | .............. | H04L 61/4511 |
| 11,182,281 B2 * | 11/2021 | Chikkala | .............. | G06F 11/3684 |
| 11,245,766 B1 * | 2/2022 | Patodia | ................. | H04L 67/125 |
| 2002/0062249 A1 * | 5/2002 | Iannacci | ................ | G06Q 30/06 705/14.1 |
| 2006/0059087 A1 * | 3/2006 | Smith | .................. | G06Q 20/102 705/40 |
| 2008/0301009 A1 * | 12/2008 | Plaster | ................. | G06Q 10/087 705/28 |

(Continued)

*Primary Examiner* — Kevin T Bates
*Assistant Examiner* — Golam Mahmud
(74) *Attorney, Agent, or Firm* — Haynes and Boone, LLP (57) ABSTRACT

There are provided systems and methods for a rapid online variable sourcing infrastructure for decision system. Specifically, endpoints may be injected into domain servers serving as a template for sourcing new data variables. When new variables are involved, a first endpoint is injected for registering variables exposed to the domain server, and a second endpoint may be injected to fetch data values at run time, e.g., during the actual decision computation. In this way, data pipeline latency can be avoided during the sourcing process, as the data variables can be sourced from domain servers at run time.

20 Claims, 8 Drawing Sheets

(56) References Cited

U.S. PATENT DOCUMENTS

| | | | |
|---|---|---|---|
| 2010/0305993 A1* | 12/2010 | Fisher | G06Q 40/00 706/47 |
| 2011/0087689 A1* | 4/2011 | Ziegler | G06Q 10/10 715/764 |
| 2011/0270964 A1* | 11/2011 | Huang | H04L 43/0864 709/224 |
| 2014/0089120 A1* | 3/2014 | Desai | G06Q 20/322 705/39 |
| 2014/0130035 A1* | 5/2014 | Desai | G06Q 20/105 717/172 |
| 2015/0012418 A1* | 1/2015 | Chu | G06Q 20/12 705/39 |
| 2015/0095235 A1* | 4/2015 | Dua | G06Q 20/4012 705/44 |
| 2015/0264055 A1* | 9/2015 | Budhani | H04L 63/0281 726/4 |
| 2015/0287077 A1* | 10/2015 | Celikyilmaz | G06Q 30/0253 705/14.51 |
| 2015/0350229 A1* | 12/2015 | Mitchell | H04L 63/1416 726/23 |
| 2016/0078444 A1* | 3/2016 | Tomasofsky | G06F 21/34 705/44 |
| 2016/0205518 A1* | 7/2016 | Patel | H04W 4/08 455/518 |
| 2019/0205871 A1* | 7/2019 | Vernon | G06Q 20/405 |
| 2019/0392449 A1* | 12/2019 | Gosset | H04L 63/083 |
| 2019/0392450 A1* | 12/2019 | Gosset | G06Q 20/12 |
| 2020/0127845 A1* | 4/2020 | Yang | H04L 9/0643 |
| 2020/0302450 A1* | 9/2020 | Misra | G06Q 30/0185 |
| 2020/0334267 A1* | 10/2020 | Ramanathan | G06N 5/04 |
| 2020/0387887 A1* | 12/2020 | Rathod | G06Q 20/3224 |
| 2021/0036889 A1* | 2/2021 | Jain | H04L 12/4641 |
| 2021/0044428 A1* | 2/2021 | Hwang | H04L 9/3239 |
| 2021/0182956 A1* | 6/2021 | Rao | G06Q 20/40 |

* cited by examiner

RAPID ONLINE VARIABLE SOURCING INFRASTRUCTURE (ROVS) FOR DECISION SYSTEMS

TECHNICAL FIELD

The present application generally relates to data integration for a decision system and more specifically to a rapid real-time variable sourcing infrastructure for decision systems.

BACKGROUND

Enterprises and financial institutions often receive various data from different data sources to perform different tasks. For example, an online financial payment processing system, such as PAYPAL®, Inc. of San Jose, Calif., USA, sometimes may receive credit card information from different credit card companies to make a decision as to whether to approve a specific transaction requested by the user. Such credit card information from each credit card company may include various variables such as a transaction date, a transaction amount, credit product applicable, risk factor, and/or the like. Thus, the online financial payment processing system may often need to source, onboard and enable the various data variables to be available for a decision engine to author and compute on.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a data connector integration framework that builds a data connector at a client device for intaking data at a fraud detection server. Systems suitable for practicing methods of the present disclosure are also provided.

Enterprises that host an online decision platform, such as such as PAYPAL®, Inc. of San Jose, Calif., USA, may often make decisions using different variables from various data sources. For example, PAYPAL® server may generate a credit up-sell message to a customer at a home screen of the customer's online account. Multiple variables from multiple domains and sources may be involved by a decision engine at the PAYPAL® server to generate the decision for the credit up-sell message.

Existing system often source the variables for the decision engine by creating a copy of the data for the variable usage, and the building pipelines to populate the variables. Specifically, a rather cumbersome process is typically involved in order to introduce a new variable for the decision engine: for example, the new variable needs to be defined for a specific rule. A data source is then created either transactional like oracle, DB2, etc., or document based such as couch base or distributed such as HBase, Hive, etc. The newly defined variable can then be populated with values after different latency processing. For instance, data values come in batch processing, e.g., in intervals, the data is fetched from the primary source for the variable. For another example, an event framework that can be created, which will act as a latency bridge to stream the variable values in the near real time. For another example, a combination of the batch processing or the near-real time event framework may be created via a lambda arch which will use streaming as the primary data source backed by a resilient batch feed. In addition to the cumbersome variable sourcing process described above, various organizational constraints such as skillsets, planning, etc. may further add to the product latency.

On the other hand, some existing systems attempt to achieve variable sourcing with an infrastructure to call an application programming interface (API) from the primary source, based on which the infrastructure computes the rule variable value. However, the API route for rule computation may demand significant investment in the respective domain teams to maintain the relationship between the domain team and the users of the rules engine. In addition, new variable sourcing may often result in a code change of the infrastructure or the API. Also, as the rule infrastructure team will own the translation of a domain variable into a rule variable, general latency in program management across all these different teams can be significant.

In view of the need for an efficient variable sourcing and onboarding infrastructure, embodiments described herein provide a rapid online variable sourcing infrastructure for decision system. As used herein, the term "online" is used to refer to a time-based manner that is during the run time of another event. For example, online variable sourcing occurs at run time of an application that requests the variables without incurring significant processing latency in the application.

Specifically, endpoints may be injected into domain servers serving as a template for sourcing new data variables. For example, when new variables are involved, e.g., in a decision task handled by a decision engine or other applications, a first endpoint is injected for registering variables exposed to the domain server, and a second endpoint may be injected to fetch data values at run time, e.g., during the actual decision computation. At run time of a decision process, an API call may be sent to each of the domain servers to fetch data values of data variables required by a decision rule to make a decision. In response to the API call, the injected endpoints at the domain servers may fetch data values from the domain service's API responses. The injected endpoints may then populate the data variables with data values to return to the decision engine for computing a decision. In this way, data pipeline latency can be avoided during the sourcing process, as the data variables can be sourced from domain servers at run time. The rule infrastructure or the domain servers may then be scaled exponentially by adding new variables or new rules at run time without significant processing latency.

Figure 1:
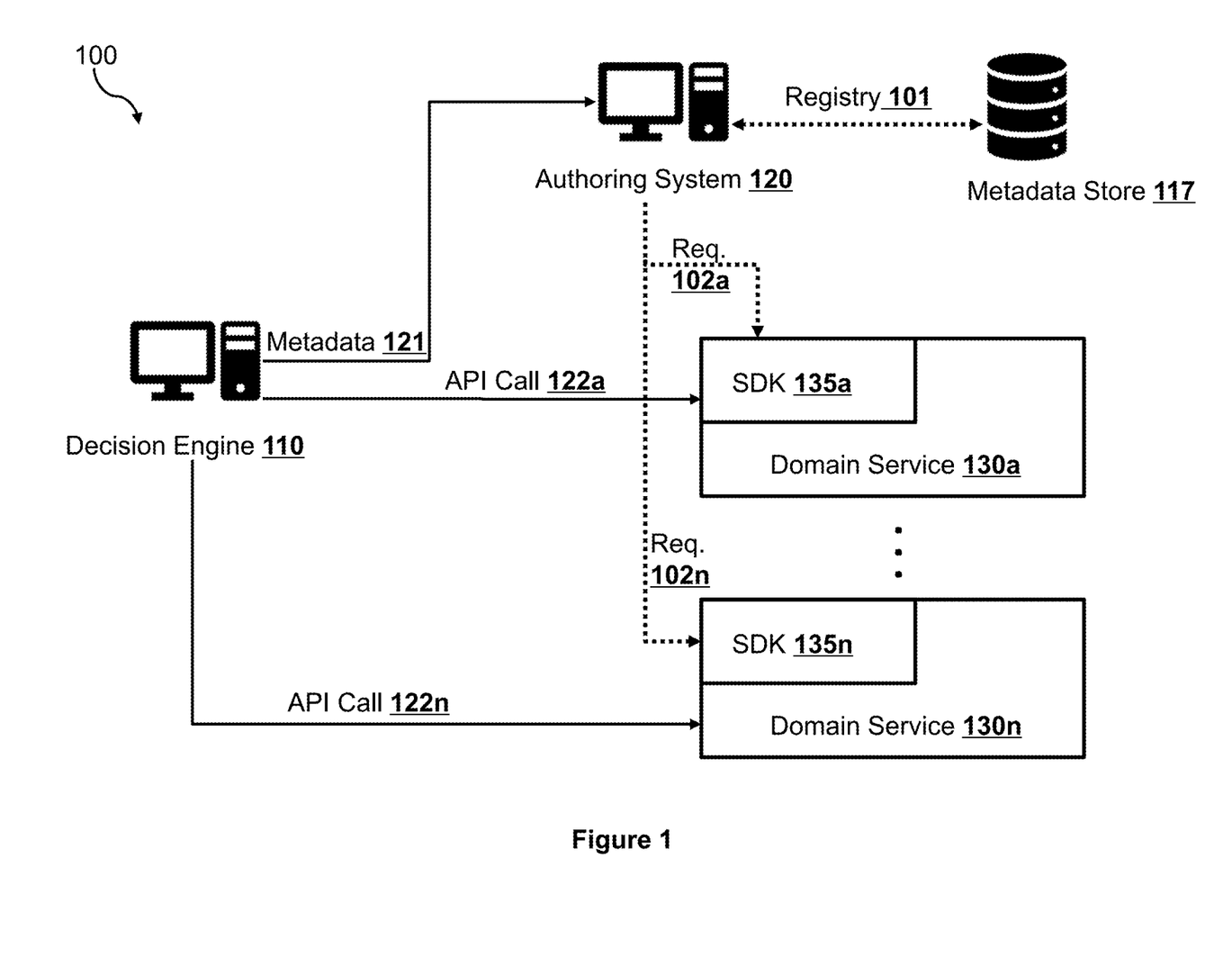
FIG. 1 is a block diagram 100 illustrating example data flows between multiple entities for an online variable sourcing infrastructure, according to one embodiment described herein.

FIG. 1 is a block diagram 100 illustrating example data flows between multiple entities for an online variable sourcing infrastructure, according to one embodiment described herein. Diagram 100 shows the system infrastructure for variable sourcing. The infrastructure includes a decision engine 110, an authoring system 120, a metadata database 117, one or more domain servers 130a-n, and the interactions therebetween.

The decision engine 110 may be implemented through software, hardware or a combination thereof. In some implementation, the decision engine 110 may be deployed at a user device, a workstation, a server, and/or the like operated by, or deployed with an institutional user, such as a bank, a merchant, a manufacturer, a distributor, and/or the like. For example, the decision engine 110 may be deployed at the PAYPAL® server, for determining whether to issue a credit up-sell message to a particular user.

The authoring system 120 may be implemented through software, hardware or a combination thereof. In some implementation, the authoring system 120 may be deployed at a user device, a workstation, a server, and/or the like operated by, or deployed with an institutional user, such as a bank, a merchant, a manufacturer, a distributor, and/or the like. For example, the authoring system 120 may be deployed at the PAYPAL® server, to author a rule infrastructure for determining whether to issue a credit up-sell message to a particular user and to register data sources for providing data variables required by the rule infrastructure.

The domain servers 130a-n may be housed differently from the decision engine 110 or the authoring system 120. For example, the domain server 130a may be the domain of a credit card company providing credit card account information and transaction information of a user. For another example, the domain server 130a may be the domain of a credit agency providing the credit rating of a user.

In one embodiment, each domain server 130a-n may host a software development kit (SDK) 135a-n, respectively. The SDK 135a-n may be in any programming language, such as but not limited to ex.java, Node.js, Python, and/or the like. The SDK 135a-n may inject endpoints into the domain server's APIs that may serve as a template to be invoked by the rules infrastructure.

For example, at least two endpoints may be injected by each SDK 135a-n. A first endpoint is injected by the SDK 135a for registering variables exposed by the data source to the domain server. For instance, the authoring system 120 may use the endpoint as a way to display the variables that are exposed from the domain server 130a-n, and that can be fully controlled by the domain service code at the domain server 130a-n for execution. In this way, a new variable can be added into the rule infrastructure without the infrastructure itself going through a code change.

A second endpoint may be injected by the SDK 135a to fetch data during the actual decision computation. For example, the decision engine 110 may send an API call 122a-n to each of the domain servers 130a-n, respectively, such that the data variables required by the decision engine 110 for the actual decision computation may be filled by data values from the domain service's API responses.

In some implementations, the SDKs 135a-n may be optional. For example, the domain servers 130a-n may generate and define the endpoints in their respective service, e.g., the domain team may program and define variables/ interfaces for the endpoints and implement programmed endpoints with the domain service. The programmed endpoints may be compliant with the API interface under the rule infrastructure at the domain server 130a-n. In this way, the programmed endpoints serve as a conduit for registering or fetching data from the domain servers 130a-n to other entities without the SDKs.

In one embodiment, at authoring stage (as shown by the arrows in dashed lines), the authoring system 120 may register variable definitions, e.g., by sending variable definition for registry 101 at the metadata store 117. The authoring system 120 may then send requests 102a-n to the SDK interfaces 135a-n at domain servers 130a-n, respectively, for registering respective data variable(s). Specifically, at each domain server 130a-n, the respective SDK 135a-n exposes one or more interfaces that are implemented at the respective domain server. For example, in response to the request 102a-n from the authoring system 120, a register Variables( ) function may be invoke by the first endpoint at the SDK 135a-n, which may return the list of registered variables to the authoring system 120.

In one embodiment, at decision stage (as shown by the arrows in solid lines), the decision engine 110 may send metadata 121 indicating updates of the rule infrastructure implemented at the decision engine to the authoring system 120. The decision engine 110 may also send an API call 122a-n to the SDK interfaces 135a-n at the domain servers 130a-n, respectively, to fetch data values for data variables that are required by a decision process at run time. For example, a populateData( ) function may be invoked during the API call 122a from the rule infrastructure triggered by the decision engine 110 at decision computation. As the authoring may have happened via the first endpoint, the domain server 130a-n may define the response values for the exposed variables so that the computation can be done for rule execution.

For example, the decision engine 110 may determine whether to issue a credit up-sell message to a particular user. This message may be determined based on multiple variables from multiple domains and sources to make that decision, e.g., a transaction_Context.cart_amount variable indicating the transaction amount, a transaction_Context.txn_country variable indicating the transaction country, a CREDIT_DS.Has_PayPal_Credit variable indicating whether the domain server has PayPal credit, a CREDIT_DS.Credit_Product_Applicable variable indicating whether the product is applicable for domain service credit, and a RISK_DS.Is_Approved_For_Credit variable indicating whether risk associated with the domain service is approved for credit. The rule infrastructure for making this decision may be defined based on the relationship between the variables:

Transaction_Context.cart_amount GREATER_THAN 100
AND Transaction_Context.txn_country EQUALS 'US'
AND CREDIT_DS.Has_PayPal_Credit EQUALS false
AND CREDIT_DS.Credit_Product_Applicable EQUALS PPC
AND RISK_DS.Is_Approved_For_Credit EQUALS true.

Thus, in this case, the domain servers registering the real-time variables may include a credit domain (namespace as CREDIT_DS), and a risk domain (namespaces as RISK_DS), which may register the domain servers with the host of the service that is providing the variable and values. The variables registered and exposed from the credit domain may include the CREDIT_DS.Has_PayPal_Credit variable, with a data type as Boolean, and the CREDIT_DS.Credit_Product_Applicable variable, with a data type as string. The variables registered and exposed from the risk domain may include the RISK_DS.Is_Approved_For_Credit variable, with a data type as Boolean.

The decision engine 110 may then take the real-time decision using a combination of variables from the transaction's context. For example, when a decision request is received at the decision engine 110, the decision engine 110 calls for real-time variable values from the credit domain and the risk domain services via API calls (e.g., any of 122a-n). These API calls may happen in parallel to the different domain servers (e.g., any of 130a-n), or alternatively in any order. Upon obtaining the values, the decision engine 110 may make a holistic decision of whether the user can be shown a credit up-sell message.

Another example can be that the decision engine 110 may determine whether to send an email when a user has an AMERICAN EXPRESS® card in their electronic wallet but the user has dropped off from a merchant site. Specifically, the variables that are involved in this decision include a FINANCIAL_INSTRUMENTS_DS.Cards_In_Wallet variable indicating what are the cards in the electronic wallet of the user, and a MERCHANT_CATEGORY_DS.Is_Store_Cash_Applicable variable indicating whether store cash is applicable for the merchant site. The rule infrastructure for making this decision may be defined based on the relationship between the variables:
Campaign_Context.Is_Targeted EQUALS true
AND FINANCIAL_INSTRUMENTS_DS.Cards_In_Wallet CONTAINS 'Amex
AND MERCHANT_CATEGORY_DS.Is_Store_Cash_Applicable EQUALS true Thus, in this case, the domain servers (e.g., any of 130a-n) registering the real-time variables include a Financial Instruments (FI) domain (namespace as FINANCIAL_INSTRUMENTS_DS), and a merchant category domain (namespaces as MERCHANT_CATEGORY_DS). The decision engine 110 may then, under the rule infrastructure, send an email notification to targeted users after confirming that the respective users have AMERICAN EXPRESS® card in their electronic wallet, and that the merchant web site is categorized as applicable for store cash.

In both the above examples, the domain servers (e.g., any of 130a-n) are reusable entities across the rules. For example, the rule of "FINANCIAL_INSTRUMENTS_DS.Cards_In_Wallet CONTAINS 'Amex'" from the second example may be reused and directly added to the rule infrastructure of the first example. The first example can thus be revised to add a condition that the decision engine 110 may send the credit up-sell message only when the user has an AMERICAN EXPRESS® card in their electronic wallet.

Adding a new domain server (e.g., to the domain server list 130a-n) associated with a new rule may be similar to registering the domain with the rule engine. Each domain server may then define their own variables and methods to fill values. In other words, in the domain's own namespace, the domain server may add their variables into any rules in the above examples based on a specific decision task with little or no processing latency.

Therefore, the system infrastructure shown in diagram 100 allows for the ability to distribute a domain-driven variable interface into different domain servers 130a-n, which permits variable sourcing in parallel from different domain servers 130a-n. In the meantime, the rule infrastructure and/or computation complexity are handled by the decision engine 110, which is out of any of the domain servers 130a-n. This allows the flexibility to create cross-domain data-based rule at run time.

In addition, the SDKs 135a-n distributed to different domain servers 130a-n, can be in different languages and thus can be used across a polyglot technology enterprise. The decision engine 110 may be any decision engine that is plugged into the framework of diagram 100 to read variables at run time. Also, unlike traditional variable sourcing process, data variables may not need to be duplicated into different systems but are logged into the decision engine 110 (or more than one decision engines) directly. Due to distributed variable sourcing structure, the system infrastructure is scalable by adding additional variables or domain servers horizontally.

Figure 2:
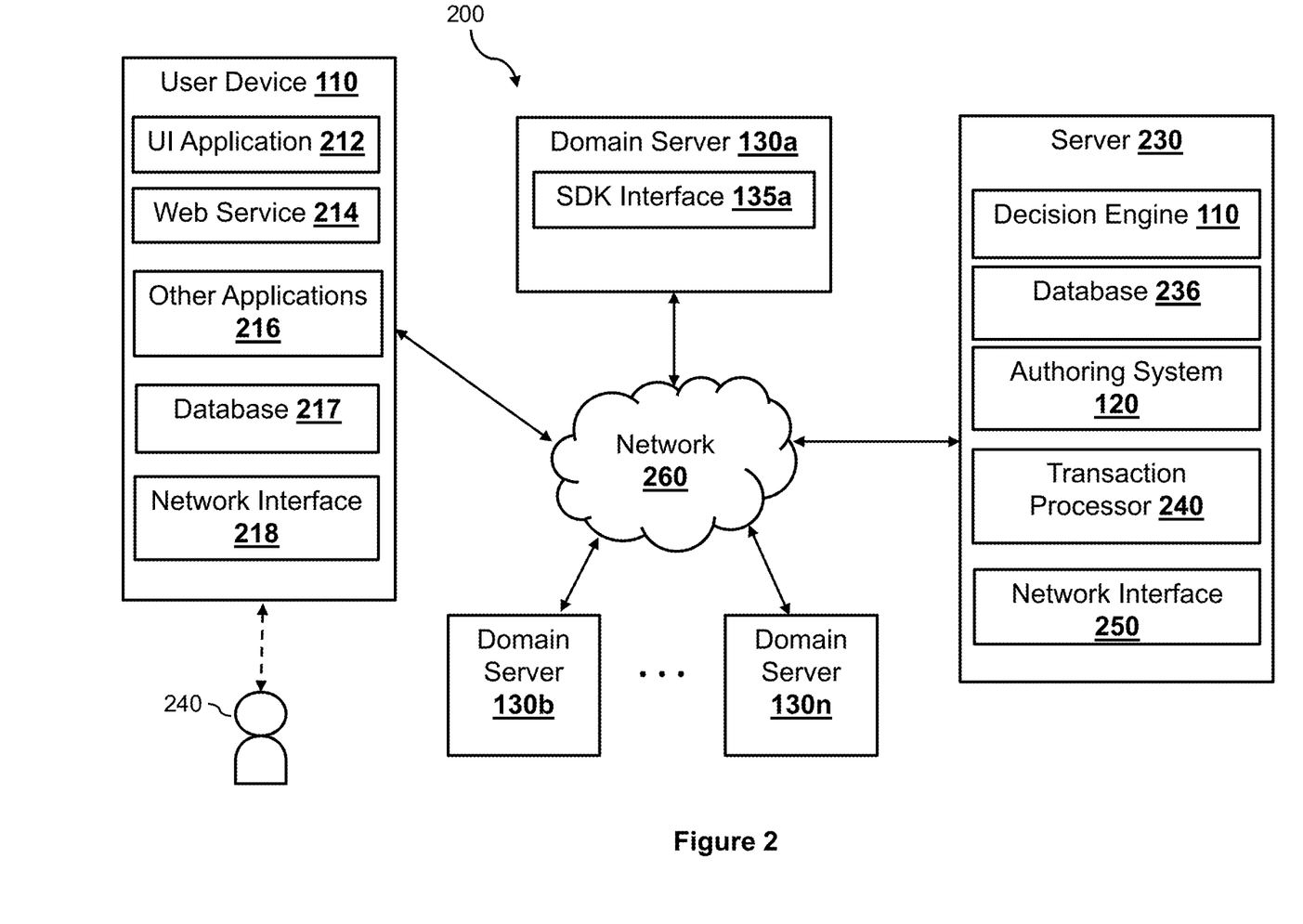
FIG. 2 is a block diagram 200 of a networked system suitable for implementing the system infrastructure described in FIG. 1 and other embodiments described herein, according to an embodiment.

FIG. 2 is a block diagram 200 of a networked system suitable for implementing the system infrastructure described in FIG. 1 and other embodiments described herein, according to an embodiment.

In one embodiment, block diagram 200 shows a system including a user device 210, domain servers 130a-n (also shown in FIG. 1), a server 230, and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, domain servers 130a-n, and the server 230 may communicate with each other over a network 260. User device 210 may be utilized by a user 240 to access the various features available for user device 210, which may include processes and/or applications associated with the server 230 to receive one or more messages relating to a decision made by the decision engine 110 at the server 230.

User device 210, domain servers 130a-n, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with domain servers 130a-n and/or the server 230. For example, in one embodiment, user device 210 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface application 212, a web service application 214, and other applications 216, which may correspond to executable processes, procedures, and/or applications with associated hardware. In other embodiments, user device 210 may include additional or different modules having specialized hardware and/or software as required.

The UI application 212 may receive and/or display data to a user 240 operating the user device 210. For example, the user 240 may operate via the UI application 212 to receive a credit up-sell message from the server 230, which may be generated by the decision engine 110, as in the respective example described in relation to FIG. 1.

The web service application 214 may correspond to one or more processes to execute modules and associated devices of user device 210 to interact with domain servers 130a-n, the server 230, or other online entity. For example, the web service application 214 may display an electronic wallet home screen to the user 240 via the network 260. In this regard, the web service application may correspond to specialized hardware and/or software utilized by user device 210.

The web service application 214 may be used to perform actions and/or interactions with data provider server 120, including browsing data and navigating between data, as well as processing electronic transactions and performing other data processing operations. The web service application 214 may correspond to a general browser application configured to retrieve, present, and communicate information over the Internet (e.g., utilize resources on the World Wide Web) or a private network. For example, the web service application 214 may provide a web browser, which may send and receive information over network 260, including retrieving website information, presenting the website information to the user, and/or communicating information to the website. However, in other embodiments, the web service application 214 may include a dedicated application of the server 130 or other entity (e.g., payment provider, etc.), which may be configured to provide services through the application.

In various embodiments, user device 210 includes other applications 216 as may be desired in particular embodiments to provide features to user device 110. For example, other applications 216 may include security applications for implementing client-side security features, programmatic client applications for interfacing with appropriate APIs over network 260, or other types of applications. Other applications 216 may also include communication applications, such as email, texting, voice, social networking, and IM applications that allow a user to send and receive emails, calls, texts, and other notifications through network 260. Other applications 216 may also include other media viewing applications to consume media content on user device 210. Other applications 216 may further include a tracking application to monitor data usage on the user device 210. Other applications 216 may include device interfaces and other display modules that may receive input and/or output information. For example, other applications 216 may contain software programs, executable by a processor, including a graphical user interface (GUI) configured to provide an interface to the user.

User device 210 may further include database 217 stored in a transitory and/or non-transitory memory of user device 210, which may store various applications and data and be utilized during execution of various modules of user device 210. Database 217 may store data tracking processes and operations, such as cookies or code snippets, which may be stored in database 217 with tracked user and/or device data. In some embodiments, database 217 may be local to user device 210. However, in other embodiments, database 217 may be external to user device 210 and accessible by user device 210, including cloud storage systems and/or databases that are accessible over network 260.

User device 210 includes at least one network interface component 218 adapted to communicate with domain servers 130a-n and/or the server 230. In various embodiments, network interface component 218 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Domain server 130a may correspond to a server of a domain service that provides data variables on a regular basis. The domain server 130a may be distributed with a SDK interface 135a, as shown in FIG. 1. The SDK interface 135a may further inject endpoints for registering data variables and/or fetching data values from the domain server 130a.

The server 230 of FIG. 2 contains a decision engine 110, a database 236, an authoring system 120, and a transaction processor 240, a network interface 250, and/or the like. The decision engine 110, as also described in FIG. 1, may correspond to one or more processes to execute software modules and associated specialized hardware to make decisions of various tasks, for example, to determine whether to send a credit up-sell message to the user device 210. In some embodiments, the decision engine 110 may determine and implement a rule infrastructure that employs one or more data variables whose values are fetched from the domain servers 130a-n to make the decision.

The authoring system 120, as also described in FIG. 1, may correspond to one or more processes to execute software modules and associated specialized hardware to author a rule infrastructure and/or to register data variables that are involved under the rule infrastructure with the domain servers 130a-n.

The server 230 may further include a database 236 used to store user information, data variables, metadata, and/or other integrated data. In some embodiments, database 236 may be local to the server 230. However, in other embodiments, database 236 may be external to the server 230 and accessible by the server 230, including cloud storage systems and/or databases that are accessible over network 260.

The server 230 may be housed with, or separately with a transaction processor 240, which may be maintained, for example, by an online service provider, which may provide online transaction processing services for payment on user device 210, as well as manage payment accounts used to send and receive payments. In this regard, the server 230 includes one or more processing applications which may be configured to interact with user device 210 and/or domain servers 130a-n to facilitate transaction processing. In one example, the server 230 may be hosted by or partnered with a transaction processor 240 that may be provided by PAYPAL®, Inc. of San Jose, Calif., USA. However, in other embodiments, the server 230 may be maintained by or include another type of service provider, which may provide payment services to a plurality of users.

The server 230 further includes at least one network interface component 250 adapted to communicate with user device 210 and/or domain servers 130a-n over network 260. In various embodiments, network interface component 250 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet and/or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of a system 200 shown in of FIG. 2.

Figure 3:
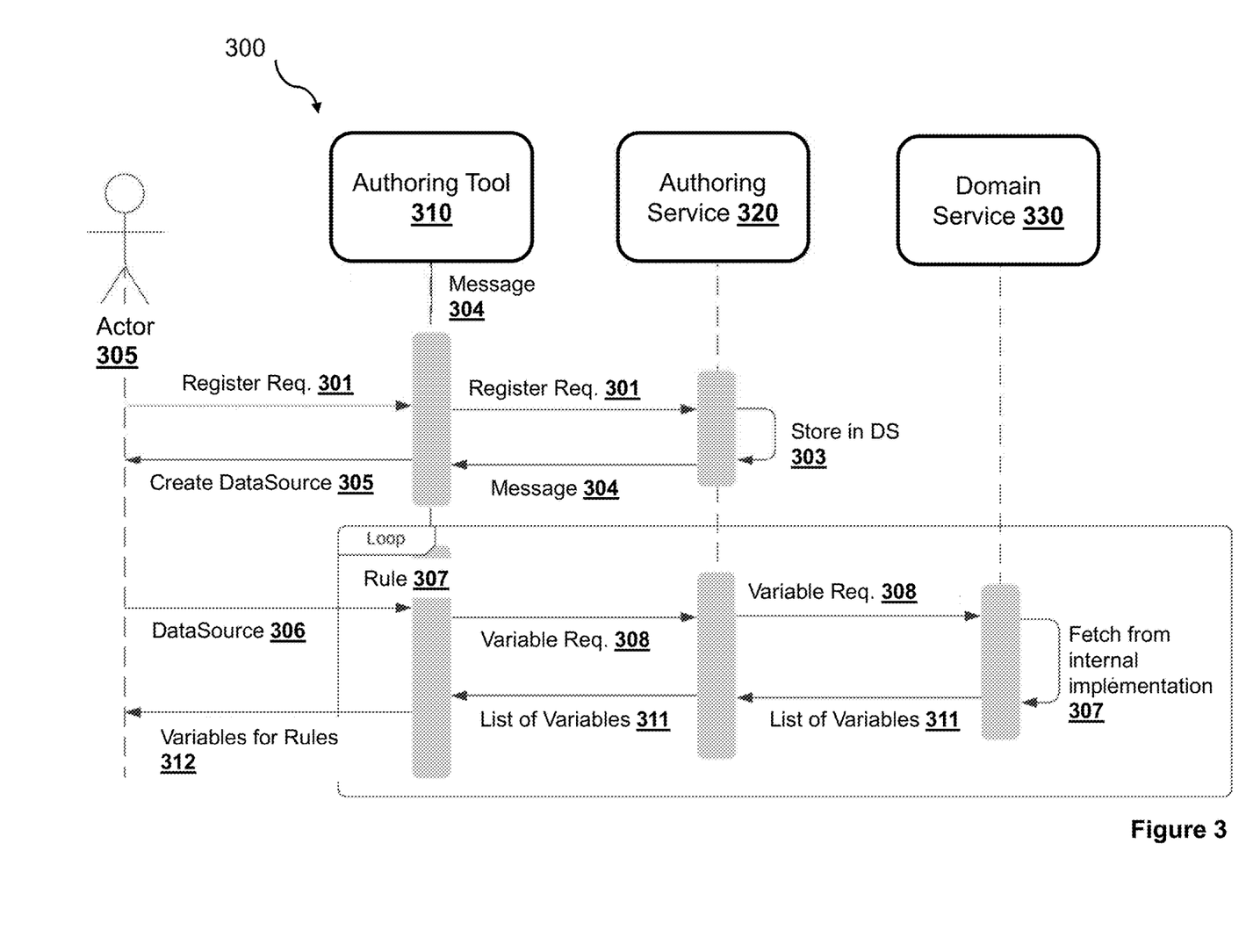
FIG. 3 provides a simplified diagram illustrating an example work flow for authoring a variable sourcing infrastructure using the system infrastructure shown in FIG. 1, according to embodiments described herein.

FIG. 3 provides a simplified diagram illustrating an example work flow 300 for authoring a variable sourcing infrastructure using the system infrastructure shown in FIG. 1, according to embodiments described herein. In one embodiment, an actor 305, e.g., a user or a subsystem that requests a specific task that involves various data variables, may send a register request 301 for new data variables to an authoring tool 310, which may be part of the authoring system 120 in FIG. 1. Upon receiving the message 302 for register data sources for the new data variables, the authoring tool 310 further forwards the register request 301 of data sources to the authoring service 320, which may be part of the authoring system 120 in FIG. 1. The authoring service may in turn store the data sources associated with the new data variables at 303 and return a message 304 indicating the registry of data sources to the authoring tool 310. The authoring tool 310 may in turn create an entry, such as a link to the relevant data source for the new data variables for the actor 305, e.g., at 306.

Subsequently, when the actor 305 invokes a request 306 for the data source, a rule 307 is authored at the authoring tool 310. For example, the rule 307 may describe a condition of the relationship between multiple data variables. The authoring tool 310 may then obtain involved data variables from the rule 307 and send a request for variables 308 to the authoring service 320. The authoring service 320 may in turn pass the variable request 308 to the domain service 330 (e.g., any of the domain servers 130a-n in FIG. 1). At the domain service 330, an SDK interface may inject endpoints into the API of the domain service 330. The injected endpoints may then, in response to the variable request 308, fetch via internal implementation of the domain service 330, e.g., at 309, a list of variables 311. The list of variables 311 are exposed to the SDK interface at the domain service 330 via the injected endpoints.

Upon obtaining the list of variables 311 at the authoring service 320 and the authoring tool 310, the authoring tool 310 may pass on the variables for writing rules 312 to the actor 305. For example, the actor 305, which may be a user of the rules team, or an application, may write the rule involving the data variables 312 for a specific decision task.

In one implementation, the authoring process 350 may be implemented repeatedly, constantly, periodically, on demand or in other manners. For example, actor 305 may repeatedly send information relating to registered data sources 306 to authoring tool 310 for injecting endpoints into domain service 330 such that data variables can be obtained for the actor 305 to write a new rule.

Figure 4:
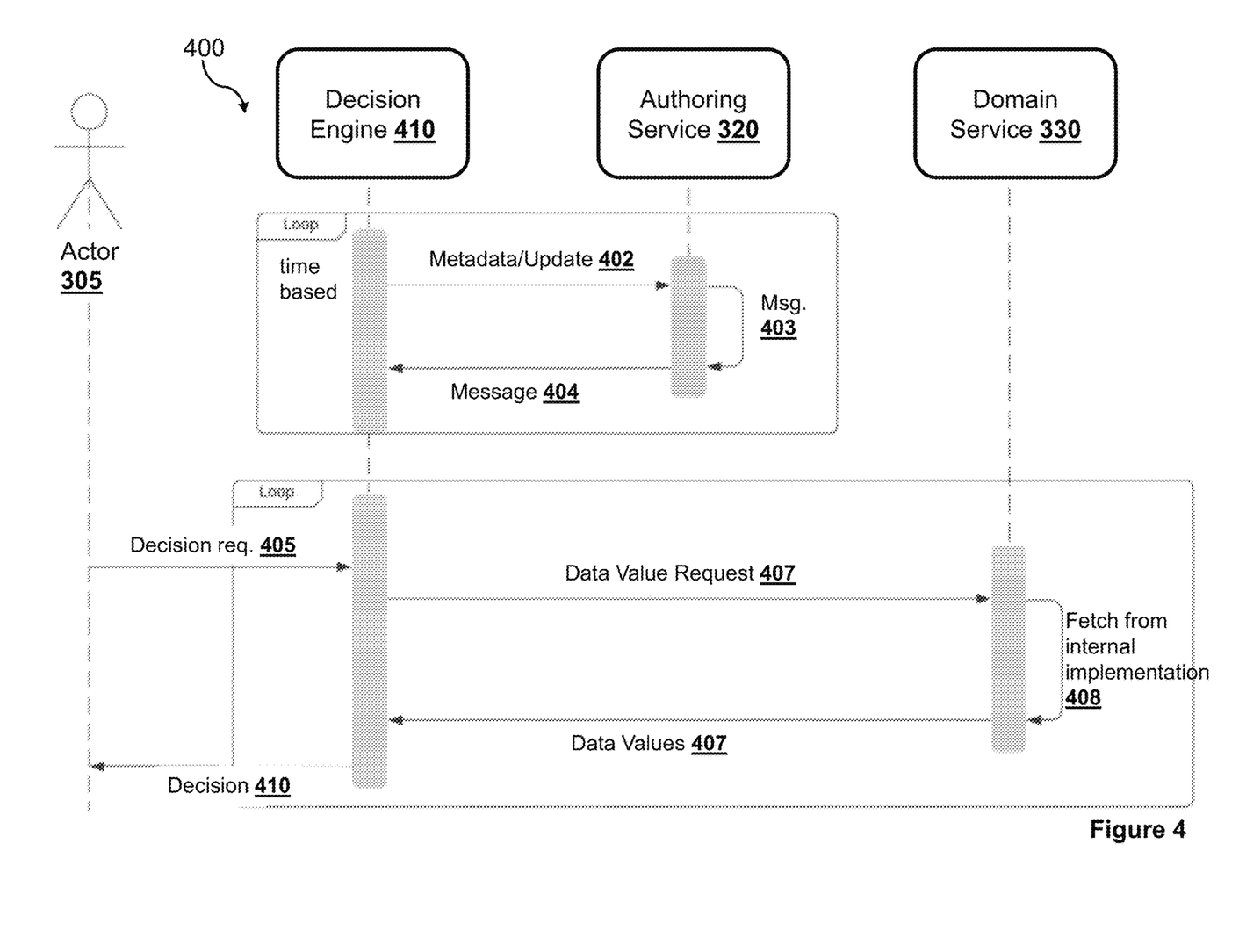
FIG. 4 provides a simplified diagram illustrating an example work flow for fetching data values for a decision process under the authored variable sourcing infrastructure in FIG. 3, according to embodiments described herein.

FIG. 4 provides a simplified diagram illustrating an example work flow 400 for fetching data values for a decision process under the authored variable sourcing infrastructure in FIG. 3, according to embodiments described herein. In one embodiment, the decision engine 110 may repeatedly, constantly, periodically, or in any other time-based manner, update metadata 402 with the authoring service 320 in the updating process 420. For example, the authoring service 320 may receive metadata/updates 402 relating to involved data variables, data sources, and/or the like from the decision engine 110, and may issue a confirmation message 403/404 to confirm registry update with the decision engine 110.

In one embodiment, the process 430 may be repeatedly, constantly, periodically, or in any other time-based manner, implemented for fetching data values for a decision process at the decision engine 110. For example, an actor 305 may send a decision request 405 to the decision engine 110, e.g., a request to send a user a credit up-sell message. The decision engine 110 may in turn invoke the rule relating to the decision task, and then send a data value request 407 to the domain service 330. Specifically, the data value request 407 may take a form as an API call to the endpoint that has been injected into the API at the domain service 330. In response to the data value request 407, a SDK interface at the domain service 330 may fetch the data values from internal implementation at the domain service 330 through the injected endpoint, e.g., at 408. Thus, the fetched data values 407 may then be sent back to the decision engine 110, which may in turn invoke the rule to make the decision based on the data values 407. The decision engine 110 may then (optionally) provide the decision 410 to the actor 305, e.g., by sending an email message or any other form of electronic communication to a requesting user, etc.

Figure 5A:
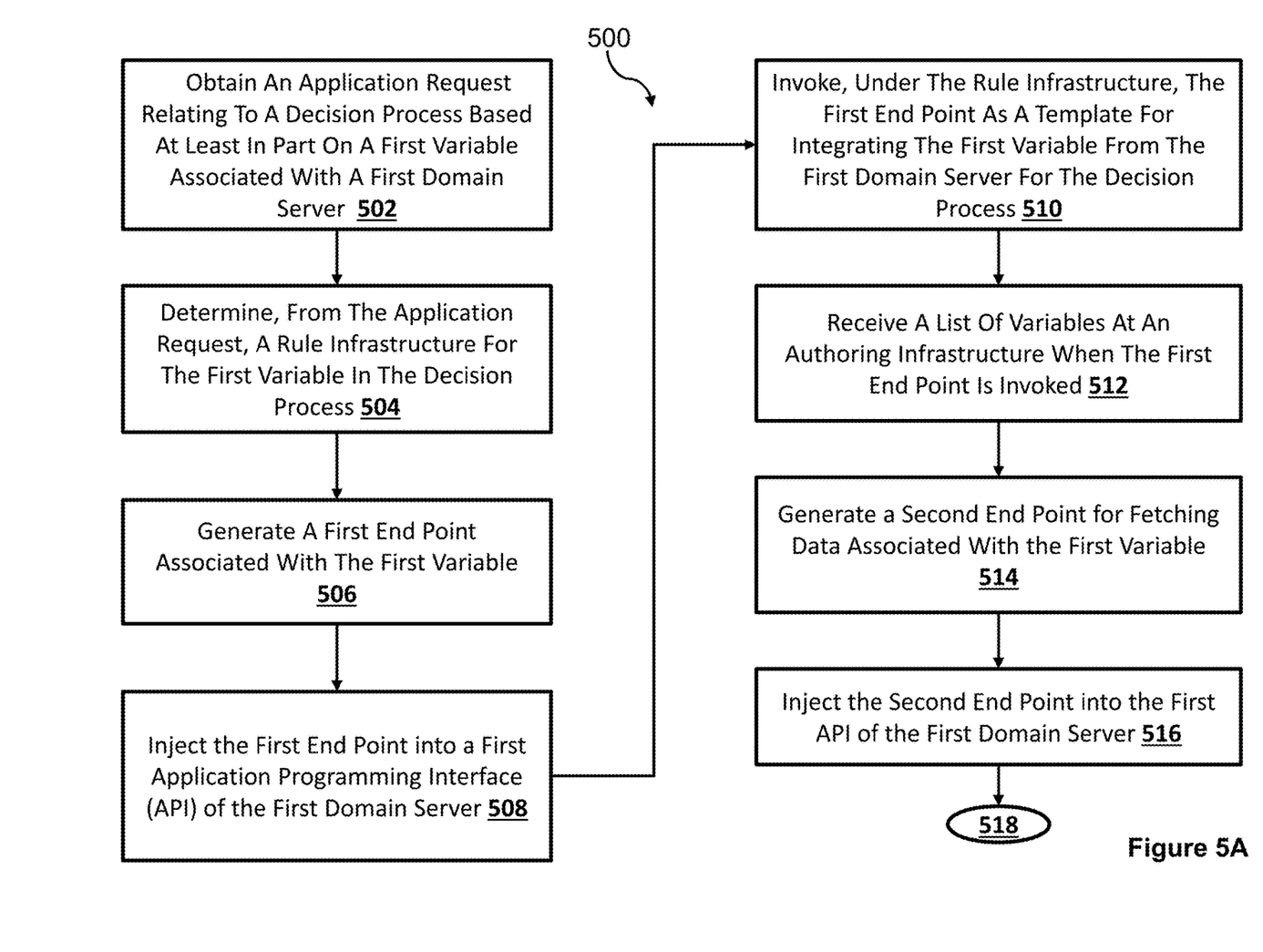
FIGS. 5A-5B is a flow diagram of an exemplary process for sourcing one or more new variables into a decision platform, according to an embodiment.
Figure 5B:
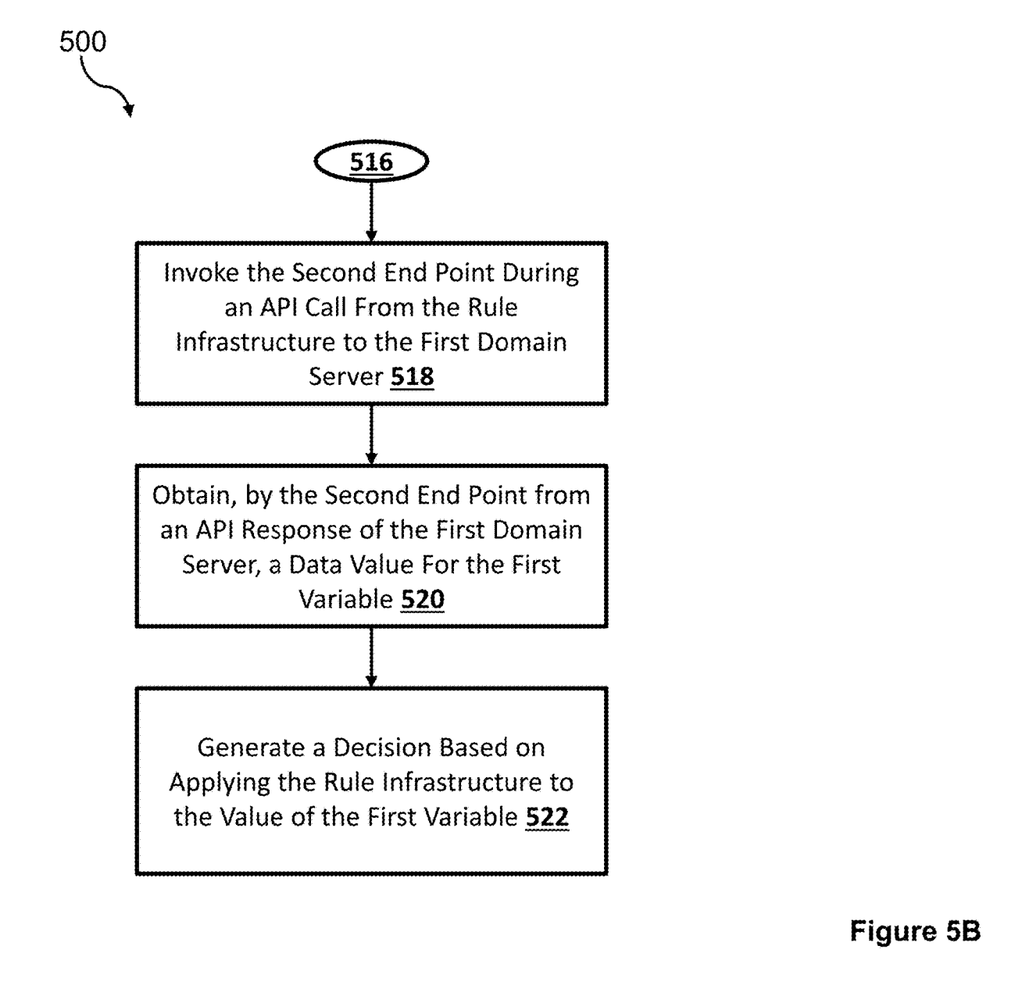

FIGS. 5A-5B is a flow diagram of an exemplary process 500 for sourcing one or more new variables into a decision platform, according to an embodiment. One or more of the subprocesses and/or steps of process 500 may be implemented, at least in part, in the form of executable code stored on non-transitory, tangible, machine-readable media that when run by one or more processors may cause the one or more processors to perform one or more of the processes. In some embodiments, process 500 may be performed by the server 230 shown in FIG. 2. It is worth noting that additional processes, steps and/or implementations may be omitted, performed in a different sequence, or combined as desired or appropriate. It is further noted that the flow diagram is for illustrative purpose only, and steps 502-522 of process 500 may occur in any different order.

Process 500 begins with step 502 where an application request relating to a decision process based at least in part on a first variable associated with a first domain server is received. For example, as described in relation to FIG. 1, the decision server 110 may receive a request to determine whether to send a credit up-sell message to a user. The decision would be based on at least a credit variable from the credit domain.

At step 504, a rule infrastructure may be determined, from the application request, for the first variable in the decision process. For example, as shown in FIG. 3, the authoring tool 310 may obtain the rule 307 from the actor 305, who may define the rule 307 in the application request.

At step 506, a first endpoint may be generated to be associated with the first variable. For example, the first endpoint may include a register Variables( ) function for registering data variables from the relevant domain server with the authoring system.

At step 508, the first endpoint may be injected into an API of the first domain server. For example, the SDK interface at the domain server may inject the first endpoint into the API of the domain server.

At step 510, the first endpoint may be invoked, under the rule infrastructure, as a template for integrating the first variable from the first domain server for the decision process.

At step 512, a list of variables may be received at an authoring infrastructure when the first endpoint is invoked. For example, as shown in FIG. 3, a list of variables may be returned to the authoring service 320 from the domain service 330 upon internal implementation 309 at the domain service 330. The first domain server is thus exposed to the list of variables via the SDK interface.

At step 514, a second endpoint for fetching data associated with the first variable may be generated. For example, the second endpoint may include a populateData( ) function for fetching data values for data variables from internal implementations at the domain server.

At step 516, the second endpoint is injected into the first API of the first domain server. For example, the SDK interface at the domain server may inject the second endpoint into the API of the domain server.

At step 518, the second endpoint may be invoked during an API call from the rule infrastructure to the first domain server. For example, an API call may be made by the decision engine 110 to the domain servers 130*a-n* as shown in FIG. 1.

At step 520, a data value for the first variable may be obtained through the second endpoint from an API response of the first domain server. Thus, at step 522, a decision may be generated based on applying the rule infrastructure to the value of the first variable.

Figure 6:
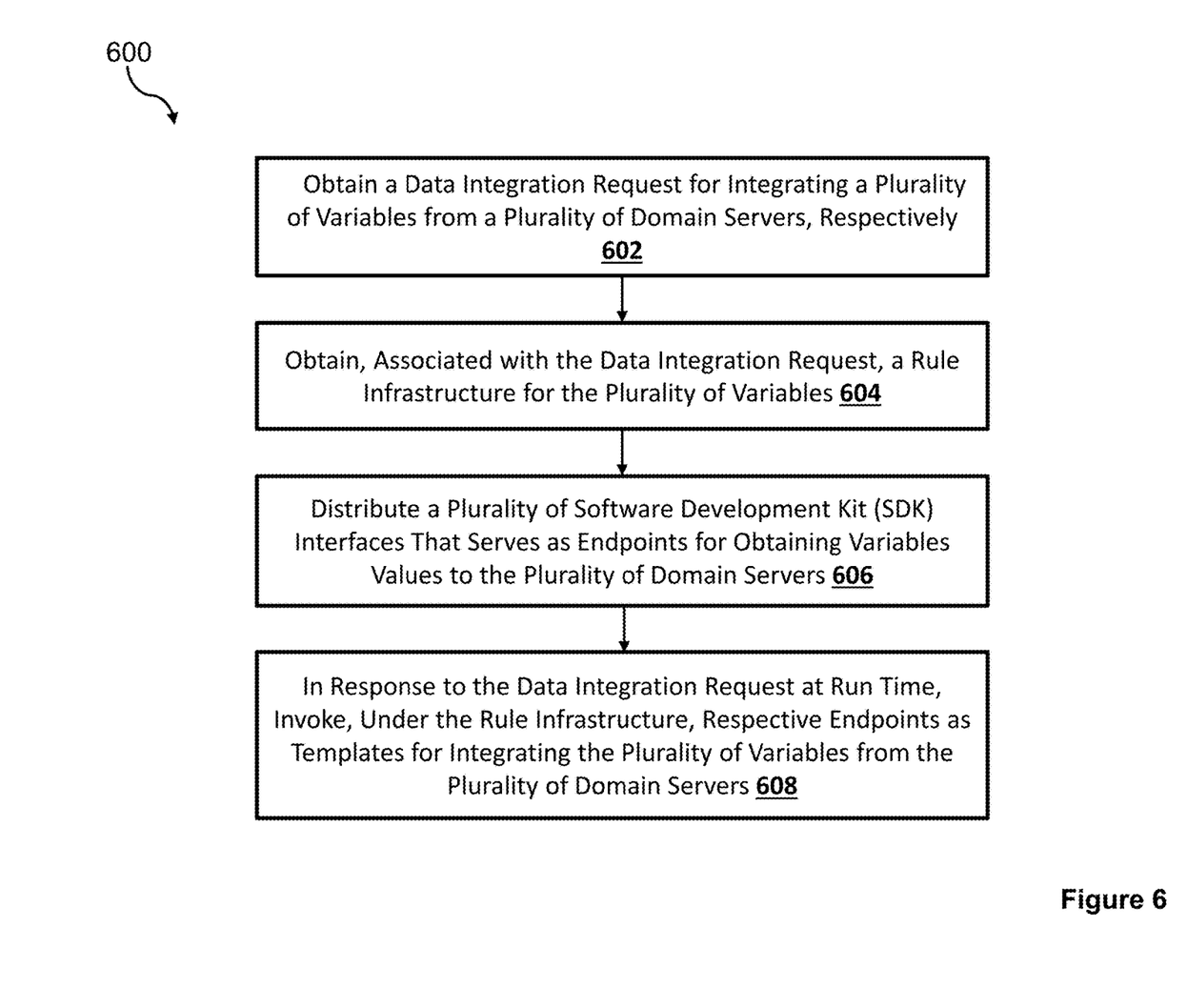
FIG. 6 is a flow diagram of an exemplary process for sourcing one or more new variables from a plurality of domain servers, according to an embodiment.

FIG. 6 is a flow diagram of an exemplary process 600 for sourcing one or more new variables from a plurality of domain servers, according to an embodiment. One or more of the subprocesses and/or steps of process 600 may be implemented, at least in part, in the form of executable code stored on non-transitory, tangible, machine-readable media that when run by one or more processors may cause the one or more processors to perform one or more of the processes. In some embodiments, process 600 may be performed by the server 230 shown in FIG. 2. It is worth noting that additional processes, steps and/or implementations may be omitted, performed in a different sequence, or combined as desired or appropriate. It is further noted that the flow diagram is for illustrative purpose only, and steps 602-608 of process 600 may occur in any different order.

Although the system infrastructure 100 shown in FIG. 1 includes a decision engine 110 which triggers the sourcing process of new data variables for a specific decision task, the decision engine 110 can be optional. Embodiments described herein of injecting endpoints into domain servers for sourcing new data variables may be applied for various different purposes, with or without a decision engine. For example, as shown in process 600, at step 602, a data integration request may be obtained for integrating a plurality of variables from a plurality of domain servers, respectively. The data integration request may be originated from any application at the server 230 in FIG. 2.

At step 604, a rule infrastructure associated with the data integration request for the plurality of variables may be obtained. For example, the rule infrastructure may be defined by the requesting application at the server 230.

At step 606, a plurality of software development kit (SDK) interfaces may be distributed to the plurality of domain servers. Each SDK interface may serve as or provide a respective endpoint for obtaining a respective variable from a respective domain server.

At step 608, in response to the data integration request at run time, respective endpoints may be invoked, under the rule infrastructure, as templates for integrating the plurality of variables from the plurality of domain servers.

Figure 7:
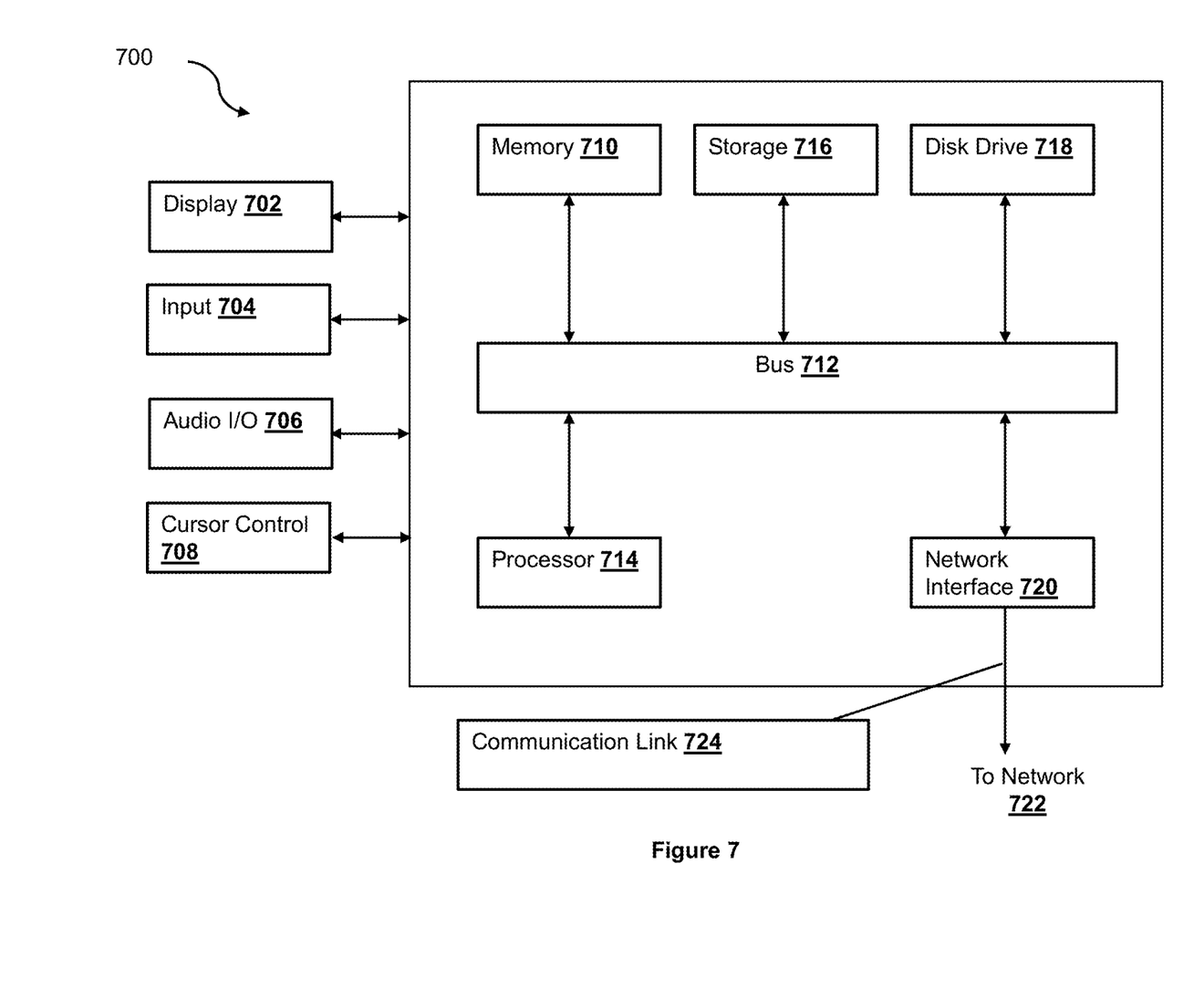
FIG. 7 is a block diagram of a computer system suitable for implementing one or more components shown in FIGS. 1-2 and performing one or more processes shown in FIGS. 3-6, according to an embodiment.

FIG. 7 is a block diagram of a computer system suitable for implementing one or more components shown in FIGS. 1-2 and performing one or more processes shown in FIGS. 3-6, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform generating a data connector at the client side described herein according to the processes 600 and 800.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method of injecting one or more new variables into a decision platform, the method comprising:
    obtaining, at an authoring server, an application request relating to a process based at least in part on a first variable associated with a first domain server of the decision platform, wherein the first variable is a new variable to the authoring server;
    determining, from the application request, a rule infrastructure associated with the first variable in the process;
    in response to the application request involving the new variable:
        generating a first endpoint for registering the first variable with the authoring server,
        injecting the first endpoint into a first application programming interface (API) of the first domain server, and
        invoking, under the rule infrastructure, the first endpoint as a template for integrating the first variable associated with the first domain server for the process;
    generating a second endpoint for fetching data associated with the first variable,
    injecting the second endpoint into the first API of the first domain server, and
    invoking the second endpoint for fetching data associated with the first variable during an API call from the rule infrastructure to the first domain server.

2. The method of claim 1, wherein the first endpoint is invoked for variable registration, and the method further comprises:
    receiving a list of variables at an authoring infrastructure when the first endpoint is invoked,
        wherein the first domain server is exposed to at least one variable from the list of variables via a data interface.

3. The method of claim 1, further comprising:
    obtaining, by the second endpoint from an API response of the first domain server, a data value for the first variable.

4. The method of claim 3, further comprising:
    generating a decision based on applying the rule infrastructure to the data value for the first variable.

5. The method of claim 1, further comprising:
    obtaining a request to add a second variable associated with a second domain server into the rule infrastructure,
    incorporating the second variable into the rule infrastructure; and
    injecting a second endpoint associated with the second variable into a second API of the second domain server.

6. The method of claim 1, further comprising:
    sending a data request to the first domain server for data relating to the first data variable in parallel to invoking the first endpoint.

7. The method of claim 1, wherein the rule infrastructure is determined out of the first domain server.

8. The method of claim 1, wherein the first endpoint is injected as a software development kit (SDK) interface into the first domain server.

9. The method of claim 8, further comprising:
distributing a plurality of SDK interfaces into a plurality of domain servers,
wherein each SDK interface serves as an endpoint for injecting a new variable.

10. A system for integrating one or more new variables from a plurality of domain servers, the system comprising:
a memory storing a plurality of processor-executable instructions; and
one or more hardware processors reading the plurality of processor-executable instructions from the memory to perform:
obtaining, at an authoring server, a data integration request for integrating a plurality of variables from the plurality of domain servers, respectively, wherein the plurality of variables are new variables to the authoring server;
obtaining, associated with the data integration request, a rule infrastructure associated with the plurality of variables;
distributing, by the authoring server, a plurality of software development kit (SDK) interfaces to the plurality of domain servers in response to the data integration request involving the new variables,
wherein each SDK interface injects a first endpoint for obtaining a respective new variable from a respective domain server when the data integration request introduces the respective new variable and then injecting a second endpoint for fetching a data value for the respective new variable; and
in response to the data integration request at run time, invoking, under the rule infrastructure, respective endpoints as templates for integrating the plurality of variables from the plurality of domain servers.

11. The system of claim 10, wherein each SDK interface is configured to serve as the respective endpoint for variable registration, and to expose the respective domain server to the respective variable when the respective endpoint is invoked.

12. The system of claim 10, wherein each SDK interface is configured to serve as the respective endpoint for populating a data value for the respective variable, and wherein the one or more hardware processors further read instructions to perform:
invoking the respective endpoint during an application programming interface (API) call from the rule infrastructure to the respective domain server; and
obtaining, by the respective endpoint from an API response of the respective domain server, the data value for the respective variable.

13. The system of claim 12, wherein the respective endpoint is invoked in response to receiving a decision request that involves at least the respective variable at run time.

14. The system of claim 13, wherein the one or more hardware processors further read instructions to perform:
generating a decision based on applying the rule infrastructure to a value of the respective variable at run time.

15. The method of claim 1, wherein the rule infrastructure is determined out of the plurality of domain servers.

16. A non-transitory processor-readable medium storing a plurality of processor-executable instructions for injecting one or more new variables into a decision platform, the plurality of processor-executable instructions being executed by one or more hardware processors to perform operations comprising:
obtaining, at an authoring server, a data integration request involving at least in part on a first variable associated with a first domain server, wherein the first variable is a new variable to the authoring server;
determining, from the application request, a rule infrastructure associated with the first variable in the decision process;
in response to the application request involving the new variable:
generating a first endpoint for registering the first variable with the authoring server,
injecting the first endpoint into a first application programming interface (API) of the first domain server, and
invoking, under the rule infrastructure, the first endpoint as a template for integrating the first variable associated with the first domain server for the process;
generating a second endpoint for fetching data associated with the first variable,
injecting the second endpoint into the first API of the first domain server, and
invoking the second endpoint for fetching data associated with the first variable during an API call from the rule infrastructure to the first domain server.

17. The medium of claim 16, wherein the first endpoint is invoked for variable registration, and the operations further comprise:
receiving a list of variables at an authoring infrastructure when the first endpoint is invoked,
wherein the first domain server is exposed to at least one variable from the list of variables via a software development kit (SDK) interface distributed at the first domain server.

18. The medium of claim 16, wherein the operations further comprise:
obtaining, by the second endpoint from an API response of the first domain server, a data value for the first variable.

19. The medium of claim 18, wherein the data integration request is associated with a decision engine, and wherein the operations further comprise:
generating, at run time, a decision based on applying the rule infrastructure to the data value for the first variable.

20. The medium of claim 16, wherein the operations further comprise:
obtaining a request to add a second variable associated with a second domain server into the rule infrastructure,
incorporating the second variable into the rule infrastructure; and
injecting a second endpoint associated with the second variable into a second API of the second domain server.

* * * * *